US010169736B1

(12) United States Patent
Dureja et al.

(10) Patent No.: US 10,169,736 B1
(45) Date of Patent: Jan. 1, 2019

(54) IMPLEMENTING DEVICE OPERATIONAL MODES USING MOTION INFORMATION OR LOCATION INFORMATION ASSOCIATED WITH A ROUTE

(71) Applicant: Amazon Technologies, Inc., Seattle, WA (US)

(72) Inventors: Nipun Dureja, Seattle, WA (US); John Nicholas Buether, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 858 days.

(21) Appl. No.: 14/493,006

(22) Filed: Sep. 22, 2014

(51) Int. Cl.
*G06F 7/04* (2006.01)
*G06F 17/30* (2006.01)
*H04N 7/16* (2011.01)
*G06Q 10/08* (2012.01)
*H04W 4/02* (2018.01)
*H04W 12/08* (2009.01)

(52) U.S. Cl.
CPC ........ *G06Q 10/0833* (2013.01); *H04W 4/023* (2013.01); *H04W 4/027* (2013.01); *H04W 12/08* (2013.01)

(58) Field of Classification Search
None
See application file for complete search history.

(56) References Cited

U.S. PATENT DOCUMENTS

| 6,504,825 | B1* | 1/2003 | Atkins | G01S 5/02 340/8.1 |
| 7,313,825 | B2* | 12/2007 | Redlich | C07K 14/70575 709/229 |
| 7,464,037 | B2* | 12/2008 | Sacks | G06Q 10/08 235/375 |
| 8,140,403 | B2* | 3/2012 | Ramalingam | G06Q 20/10 705/26.1 |
| 8,856,916 | B1* | 10/2014 | Sobel | G06F 21/62 726/17 |
| 9,571,522 | B2* | 2/2017 | Zhang | H04L 63/20 |
| 2006/0111955 | A1* | 5/2006 | Winter | G06Q 10/06 705/7.19 |

(Continued)

OTHER PUBLICATIONS

Seng Loke. 2006. Context-Aware Pervasive Systems. Auerbach Publications, Boston, MA, USA.*

*Primary Examiner* — Lynn D Feild
*Assistant Examiner* — Vadim Savenkov
(74) *Attorney, Agent, or Firm* — Lee & Hayes, P.C.

(57) ABSTRACT

This disclosure is directed to controlling operation of a deployed device to selectively initiate different operational modes, which may include an employee mode, a customer mode, and/or a secure mode. While operating in the employee mode and/or customer mode, the deployed device may enable some access to information specified for the respective user while restricting some nonessential information. While operating in the secure mode, the device may restrict access to at least some information, at least temporarily. In some embodiments, the secure mode may require credentials, a decryption key, and/or other security information to enable continued use of the deployed device by the employee or possibly by the customer. The selection of the operational mode may be based at least in part on a deviation of the device's location from a predetermined route.

20 Claims, 8 Drawing Sheets

(56) References Cited

U.S. PATENT DOCUMENTS

| | | | |
|---|---|---|---|
| 2006/0178817 A1* | 8/2006 | Suzuki | G01C 21/20 |
| | | | 701/420 |
| 2008/0034224 A1* | 2/2008 | Ferren | G06F 21/88 |
| | | | 713/193 |
| 2009/0083555 A1* | 3/2009 | Challener | G06F 21/6209 |
| | | | 713/310 |
| 2010/0100507 A1* | 4/2010 | Davidson | G06Q 10/04 |
| | | | 705/412 |
| 2012/0042046 A1* | 2/2012 | Petersen | G06Q 30/0282 |
| | | | 709/219 |
| 2012/0212323 A1* | 8/2012 | Skaaksrud | G06F 21/6245 |
| | | | 340/5.74 |
| 2012/0253548 A1* | 10/2012 | Davidson | G06Q 10/08 |
| | | | 701/1 |
| 2013/0085550 A1* | 4/2013 | Polefko | A61N 1/3605 |
| | | | 607/59 |
| 2013/0103606 A1* | 4/2013 | Holliday | G06Q 50/28 |
| | | | 705/333 |
| 2013/0132477 A1* | 5/2013 | Bosworth | G06Q 50/01 |
| | | | 709/204 |
| 2013/0185386 A1* | 7/2013 | Hashida | G06F 17/30241 |
| | | | 709/217 |
| 2013/0211660 A1* | 8/2013 | Mitchell | G08G 1/127 |
| | | | 701/29.3 |
| 2016/0012720 A1* | 1/2016 | Boss | G08G 1/096822 |
| | | | 701/118 |

\* cited by examiner

IMPLEMENTING DEVICE OPERATIONAL MODES USING MOTION INFORMATION OR LOCATION INFORMATION ASSOCIATED WITH A ROUTE

BACKGROUND

With the increased popularity and expanded use of portable devices, these devices are continually deployed and used in new and different ways. One recent trend is to share a device between a merchant and a customer during a transaction. Often the merchant will initiate a transaction on a device and then allow the customer to enter information associated with a payment and possibly make other selections before returning the device to the merchant.

Many devices are protected by passwords and/or other security measures that, when known and/or provided by a user, allow access to the device. For example, a computing device's operating system may require entry of a correct password to access resources and/or to obtain functionality of the device. In some instances, devices time out, and thus require re-entry of a password or other security information to continue access to resources and/or to resume desired functionality of the device. However, when devices are temporarily used by another user, such as a customer, who does not have the password or other security information, the other person may be unnecessarily restricted from an otherwise approved use of the device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
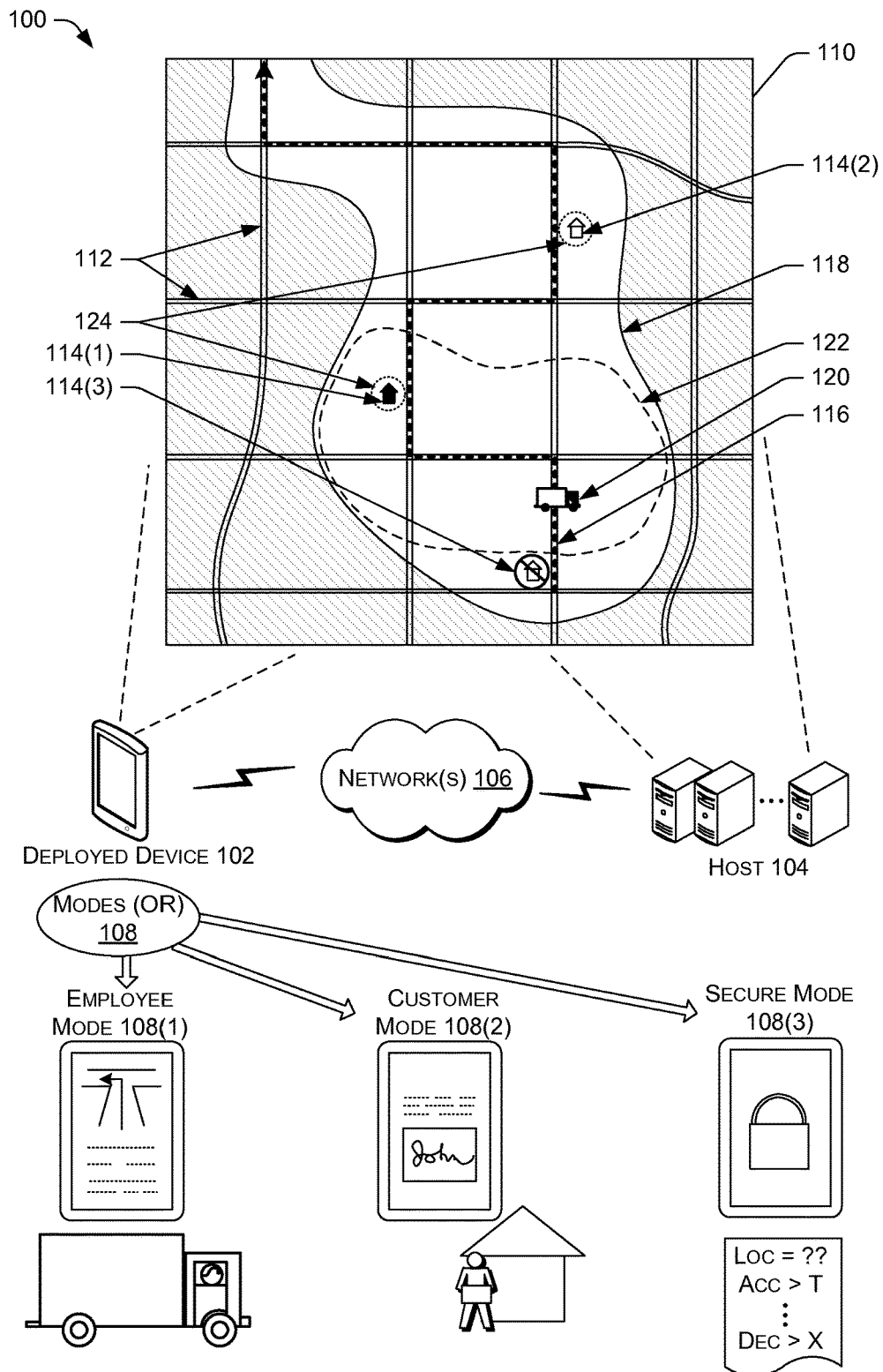
FIG. 1 is a schematic diagram of an illustrative environment that shows operation of a deployed device with respect to motion information and/or location information associated with a route and/or a boundary of a destination.

This disclosure is directed to controlling operation of a deployed device to selectively initiate different operational modes, including at least a secure mode. The deployed device may be deployed for use by an employee to assist with picking up items from customers and dropping off items for customers. As described herein, the deployed device may operate in various modes, which may include an employee mode, a customer mode, and/or a secure mode. While operating in the employee mode and/or customer mode, the deployed device may enable access to information specified for the respective user. While operating in the secure mode, the device may restrict or prevent access to information, at least temporarily. In some embodiments, the secure mode may require credentials, a decryption key, and/or other security information to enable continued use of the deployed device by the employee or possibly by the customer.

In accordance with various embodiments, the deployed device may determine a location associated with one or more items to be picked up or dropped off at a destination. The deployed device may obtain route information for a route to the destination, as well as to other possible destinations. The route information may include a threshold associated with the route, which may define an allowable deviation from the route. In some embodiments, the threshold may include temporal information that designates a portion, but not all, of the route as being within the threshold. The deployed device may determine a current location of the device, which may be compared to the threshold and used to determine whether the deployed device operates in the employee mode or the secure mode. When the deployed device is determined to be within the threshold of the route, the device may operate in the employee mode. In the employee mode, the deployed device may at least provide route information for a next destination, provide at least some customer information, and provide at least some information about the items to be picked up or dropped off, thus allowing the employee to successfully perform operations related to pick up and/or drop off of items. In various embodiments, the deployed device may be configured to allow detours and/or rerouting while remaining within the threshold or within a revised threshold.

The deployed device may determine when the current location of the deployed device is within a boundary of a destination associated with a customer. The deployed device may then initiate a customer mode that may restrict at least some functionality of the device when the device is used by the customer, for example, when the device is passed to a customer to collect payment information, a signature, and/or other information from the customer. The customer mode may provide some information about the items for the customer and/or provide some information about the customer. The customer mode may enable entry of information by the customer, such as entry of a signature and/or other inputs, including typed inputs, audio inputs, and image capture, for example. The customer mode may restrict access to at least some route information, previous/next item/customer information and/or other privileged, private, or sensitive information.

In some instances, the deployed device may temporarily lose connectivity and/or access to location information. In some embodiments, the deployed device may initiate the secure mode during at least a portion of the time without the location information and/or the connectivity, and then resume either the employee mode or the customer mode after retaining the location information and/or the connectivity that locates the device within the threshold and/or the boundary.

In various embodiments, the deployed device may maintain data that is encrypted. At various different times, depending on the location and use of the deployed device, the deployed device may receive a decryption key. For example, the deployed device may receive the decryption key based on the location of the deployed device relative to the boundary and/or the threshold, as discussed above, which may enable the device to decrypt local data that can then be used to benefit the employee and/or the customer (e.g., provide routing information, provide order information, etc.). The decryption key may be overwritten on the device periodically to secure data on the device from access by unauthorized or unscrupulous people. The decryption key may then be retrieved again after another verification of the location of the deployed device relative to the boundary and/or the threshold, and so on to enable periodically securing and then making the data accessible/usable on the device during authorized and expected operation (e.g., within the threshold/boundaries). However, when the deployed device exits the threshold and/or the boundaries, then the decryption key may be made inaccessible by the deployed device possibly until correct security information is received (e.g., credentials).

In some embodiments, the deployed device may continually purge outdated, used, or other non-essential data stored locally on the device, such as by overwriting the data with other useless data. For example, after the employee has dropped off an item at a destination associated with a customer and the resulting data has been uploaded to a host device via a network, then the deployed device may purge information associated with the dropped off item and the customer to prevent access to this information by others via the device if the device were stolen or lost.

The deployed device may initiate the secure mode in response to some detected motions. In some embodiments, a detected acceleration that exceeds a predetermined acceleration limit may cause the deployed device to enter the secure mode. For example, this may protect against use by an unscrupulous person who steals/swipes the deployed device from the employee or customer. In various embodiments, a detected deceleration that exceeds a predetermined deceleration limit may cause the deployed device to enter the secure mode. For example, when the device is dropped or in a vehicle that is in an accident, the deployed device may initiate the secure mode automatically to prevent unauthorized use.

The techniques and systems described herein may be implemented in a number of ways. Example implementations are provided below with reference to the following figures.

Illustrative Environment

FIG. 1 is a schematic diagram of an illustrative environment 100 that includes a deployed device 102 (or simply the "device" 102) in communication with a host 104 via one or more networks 106. The networks 106 may include any type of wired or wireless networks, such as mobile telephone networks, satellite networks, Wi-Fi networks, and so forth. The device 102 may be practically any type of device that facilities user interaction and is capable of communication with the host 104 via the networks 106. For example, the device 102 may be implemented as a mobile telephone, a tablet computer, a notebook computer, an electronic document reader, a navigation device, a custom electronic device, and so forth.

Meanwhile, the host 104 may exchange various types of information with the device 102. For example, the host 104 may be operated by a service provider or courier that deploys workers (e.g., workers, employees, contractors, etc.) to pick up and/or drop off items at various destinations. Although the description below refers to "employee", other types of individuals or workers may be used, such as contractors, volunteers, or other people working under other relationships with an entity. The host 104 may provide information to the device 102 regarding the items to be picked up or dropped off as well as relevant location information, customer information, and so forth. The device 102 may transmit information to the host 104, such as confirmations of actions, customer acknowledgements, route information, payments, and so forth. Thus, by interacting together, the device 102 and the host 104 may enable efficient drop off and pick up of items for customers. The host 104 may be implemented by one or more computing devices in a distributed configuration (e.g., cloud services) or non-distributed configuration.

In some embodiments, the device 102 may function in one of an employee mode 108(1), a customer mode 108(2), and/or a secure mode 108(3); however, more or fewer operational modes 108 may be used. The device 102 may include security features to cause the device 102 to restrict functionality in some instances, such as by initiating the secure mode 108(3). The secure mode 108(3) may prevent access to private, privileged, and/or sensitive information by unauthorized people, such as if the device is lost or stolen. However, the device 102 may also allow continued access by the employee and/or a particular customer while certain conditions are satisfied, such as location/route/boundary constraints, and/or other events are not detected, such as acceleration/deceleration limits, as described herein.

The device 102, possibly in conjunction with the host 104, may obtain routing information associated with items for one or more destinations. As shown in FIG. 1, mapping information 110 may be generated that includes paths 112 (e.g., streets, highways etc.) and destinations 114 associated with pick up or drop off tasks or actions for an employee. The mapping information 110 may provide rules that initiate different ones of the operational modes 108 of the device 102, control transmission of a decryption key used by the device 102, and/or cause enforcement of other rules by the device 102. Some of the mapping information 110 may be provided for display to the employee or other people for use in picking up or dropping off items. However, the mapping information 110 may take other forms when displayed to the employee or other people, such as a form of a step-by-step navigation interface, for example, as shown in an example interface associated with the employee mode 108(1).

The mapping information 110 may include a destination (e.g., one of the destinations 114), which may be a pick up destination 114(1) (shown as a black icon) where one or more items are picked up (collected) from a customer (e.g., business owner, resident, etc.), or a drop off destination 114(2) (shown as a white icon) where one or more items are dropped off (delivered) to a customer. Previous destinations 114(3), when still made available from the mapping information 110, may be designated as expired. Other destinations may include a distribution center, a fulfillment center, a transfer location, an airport, and so forth. A route 116 may be generated to guide the employee who has the device 102 between two or more of the destinations 114. In some embodiments, the route 116 may be generated by the host 104 and transmitted to the device 102 for use by the employee. However, the route 116 may be generated by the device 102 based on the destinations 114. In any event, the route 116 may be used to determine one of the operational modes 108 of the device 102 and/or rules for management of data (e.g., whether to transmit a decryption key, whether to overwrite data, etc.). A threshold may be applied to the route 116 to allow for minor deviations in the route, to accommodate location tracking inaccuracy and/or minor driving errors (and possibly for other reasons) to create a zone 118 around the route 116.

The device 102 may track the current location 120 of the device 102, such as by using Global Positioning System (GPS) data, triangulation data, or other known techniques to locate the device 102. The current location 120 may then be compared to the zone 118 to determine whether the device 102 is within the zone 118 or outside of the zone 118.

When the device 102 is determined to be outside of the zone 118 (shown in the mapping information 110 with cross-hatching) and/or when the device 102 experiences an acceleration or deceleration that exceeds a limit, then the device 102 may initiate the secure mode 108(3) to prevent unauthorized access to data stored on the device or accessible via the device 102. The secure mode 108(3) may, in some instances and during some times, enable a person, such as the employee, to regain access to the device and cause the device to operate in other ones of the operational modes 108, such as the employee mode 108(1) or the customer mode 108(2). For example, the employee may enter credentials and/or otherwise override the secure mode 108(3), possibly through interaction with a second device and/or interaction with the host 104.

When the device 102 is determined to be inside of the zone 118, then the device 102 may operate in the employee mode 108(1). For example, the device 102 may provide routing information to the employee to assist the employee in travel to a next destination to complete a next task or action.

In some embodiments, the threshold associated with the route 116 may include temporal information to limit the zone 118 to a temporal zone 122 that moves along the route 116 as the employee progresses along the route. For example, the previous destination 114(3) may be excluded from the temporal zone 122 after the device 102 determines that employee left the previous destination 114(3) based on the current location 120. When the temporal zone 122 is used, then the current location 120 may be compared to the temporal zone 122 rather than to the zone 118.

The mapping information may include boundaries 124 associated with various ones of the destinations 114. The boundaries 124 may be associated with destinations where customer interaction is expected or required. The boundaries 124 may indicate where the device 102 may initiate the customer mode 108(2). For example, when the device 102 detects that the current location 120 is within one of the boundaries 124, then the device 102 may initiate operation in the customer mode 108(2) and limit accessible information to specific information associated with that particular destination. For example, the customer mode 108(2) may restrict access to customer information, item information, and/or other data associated with that specific destination, and not other previous or future destinations that may be along the route 116. An example of information is shown with in FIG. 1 with respect to the customer mode 108(2) as a signature collection form; however, other information may be provided to or received from the customer.

In summary, the mapping information 110 may be used in conjunction with the current location 120 of the device 102 to determine one of the operational modes 108 of the device 102 as one of the employee mode 108(1), the customer mode 108(2), and/or the secure mode 108(3). The mapping information 110 may be used in conjunction with the current location 120 of the device 102 to determine management of data to/from the device 102 and/or by the device 102. For example, when the current location 120 of the device 102 is determined to be located outside of the zone 118 or the temporal zone 122 (when the temporal zone is used), then the host 104 may not transmit, at least for some amount of time, a decryption key to the device 102 to allow the device 102 to decrypt local data stored on the device. This may prevent any meaningful access of data via the device 102 until the decryption key is again made accessible. As another example, when the device 102 determines that it is located outside of the zone 118 for more than a predetermined amount of time, the device 102 may enter the secure mode 108(3) and initiate erasing/overwriting memory as an additional safeguard to protect information from access by unauthorized people.

Illustrative Computing Architecture

Figure 2A:
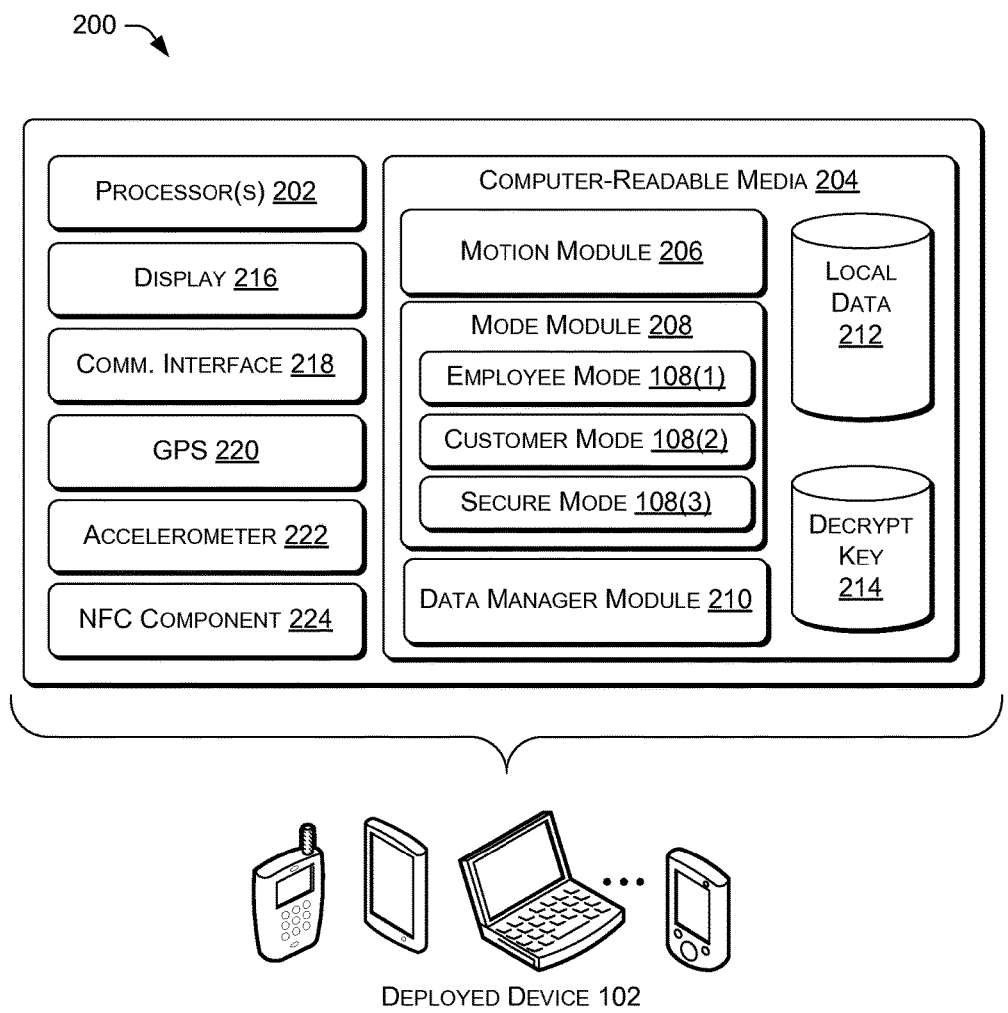
FIG. 2A is a block diagram of an illustrative computing architecture of the deployed device shown in FIG. 1.

FIG. 2A is a block diagram of an illustrative computing architecture 200 of the deployed device shown in FIG. 1. The computing architecture 200 may be implemented in a non-distributed configuration or a distributed configuration. In a distributed configuration, at least some of the computations/processing may be performed by other devices, such as by the devices of the host 104.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the device 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store a motion module 206, a mode module 208, and a data manager module 210, which are described in detail below. The components may be stored together or in a distributed arrangement. Computer-readable media 204 may also store local data 212 and possibly a decryption key 214 when the local data is encrypted data. The local data 212 may include data about the items, customers, and routes associated with the items to be picked up and/or dropped off. However, at least some of the local data 212 may be purged at times, as discussed below, to remove possible exposure to third parties of private, sensitive, or privileged information. In some embodiments, the computing architecture 200 may further include one or more of a display 216 (e.g., a touch interface display, a liquid crystal display, etc.), a communication interface 218 to facilitate connectivity via the networks 106, a GPS 220, an accelerometer 222 to detect motion of the device along one or more axes, and a near field communications (NFC) component 224 to possibly provide location information, such as relative to a delivery vehicle.

The motion module 206 may track motion of the device 102 using one or more of the GPS 220, the accelerometer 22, and/or the NFC component 224. For example, the motion module 206 may collect location information for the current location 120 of the device, which may be used by the device 102 or the host 104 in comparison with the threshold or boundary information as discussed above. Thus, the motion module 206 may provide information to the host 104, which may then assist in managing operation of the device 102, or the motion module 206 may process data locally to determine how to manage operation of the device 102 based on location information with respect to the threshold and boundaries. In some embodiments, the motion module 206 may measure acceleration/deceleration via the accelerometer 222. This measurement may be compared to limits, which when exceeded, are communicated to the mode module 208 for selection of the mode, as discussed below. In some embodiments, the NFC component 224 may be used to determine connectivity, and thus distance, from a specific location, such as a delivery vehicle. For example, the NFC component 224 may be used to determine that the device 102 has been removed from the delivery vehicle. This may indicate to the mode module 208 to switch operation to the customer mode 108(2) or the secure mode 108(3) depending on the location with respect to a boundary and/or other relevant information. For example, the NFC component 224 may be implemented in a dock in a delivery vehicle.

The mode module 208 may select a mode of operation of the device based at least in part on the information from the motion module 206. For example, when the current location 120 of the device 102 is within the threshold and outside of any boundary, then the mode module 208 may cause the device 102 to operate in the employee mode 108(1). The employee mode 108(1) may provide relevant information, user interfaces, and data (visual and/or audio) for access by the employee including, without limitation, navigation instructions, destination information, item information, and customer information.

When the current location 120 of the device 102 is within a boundary, then the mode module 208 may cause the device 102 to operate in the customer mode 108(2). As discussed above, the NFC component 224 may also be used, possibly in conjunction with the boundary, to cause the mode module 208 to initiate the customer mode 108(2). The customer mode 108(2) may provide relevant information, user interfaces, and data (visual and/or audio) for access by the customer including, without limitation, item/order information pertaining to a specific customer, authorization information (signature request, etc.), and possibly billing information. The customer mode 108(2) may restrict access to some information, such as other customers' data, other locations, and so forth which are not relevant to a particular customer.

When the current location 120 of the device 102 is outside of the threshold, then the mode module 208 may cause the device 102 to operate in the secure mode 108(3). The secure mode 108(3) may limit or restrict use of some or all features of the device 102. The secure mode 108(3) may be terminated by receipt and verification of correct credentials, which may be received by keyed or other user input, by a file (e.g., data card, network data, etc.), or by other ways of transmitting data to the device, including transmitting a decryption key, as discussed herein.

The data manager module 210 may receive and manage the local data 212 on the device 102. The data manager 210 may purge data, such as by overwriting data, which is no longer needed on the device, such as information pertaining to previously visited destinations, thereby limiting possible exposure to private, privileged, or sensitive information by third parties. In some embodiments, the data manager module 210 may manage use of the decryption key 214, which may be received at times and used to decrypt data on the device 102, such as at least a portion of the local data 212. The data manager module 210 may overwrite the decryption key, which can be accomplished quickly, to secure the device, and may later receive the decryption key again, from the host 104 or another source, and use the decryption key to again decrypt data stored in the local data 212. In some embodiments, the host 104 may periodically transmit the decryption key 214 to the device 102 when the current location 120 of the device 102 is verified to be within the threshold. Meanwhile, the data manager 210 will overwrite the decryption key periodically after use, such as after loading information for a next destination, to limit possible exposure or access to other data stored in the local data. Thus, the data manager module 210 may manage the local data 212 to minimize possible exposure of this data to third parties, such as if the device is stolen or lost.

Figure 2B:
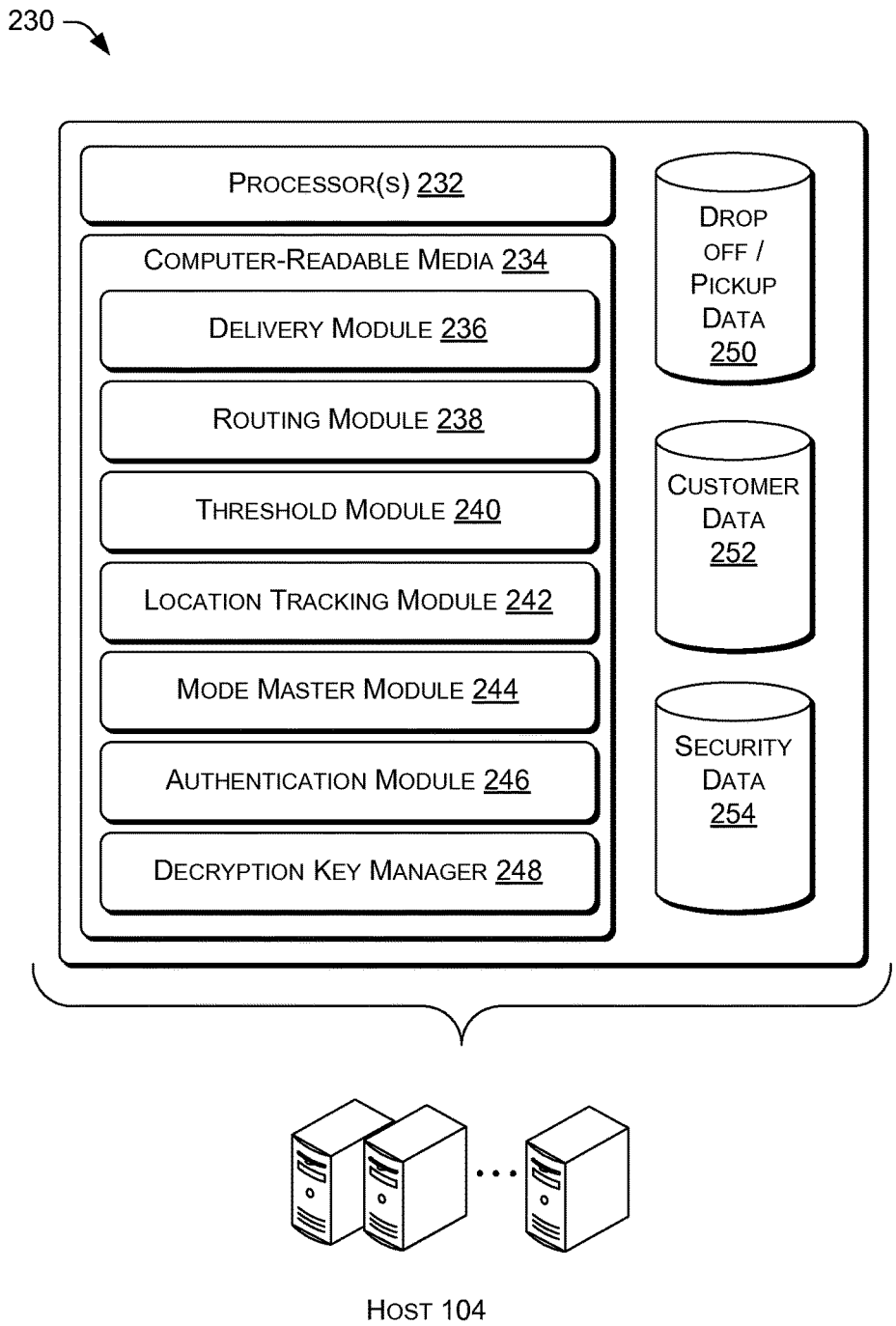
FIG. 2B is a block diagram of an illustrative computing architecture of one or more computing devices associated with a host that exchanges information with the deployed device shown in FIG. 1.

FIG. 2B is a block diagram of an illustrative computing architecture 230 of one or more computing devices associated with a host that exchanges information with the deployed device shown in FIG. 1. The computing architecture 230 may be implemented in a non-distributed configuration or a distributed configuration. In a distributed configuration, at least some of the computations/processing may be performed by other devices, such as by the device 102 or other devices.

The computing architecture 230 may include one or more processors 232 and one or more computer readable media 234 that stores various modules, applications, programs, or other data. The computer-readable media 234 may include instructions that, when executed by the one or more processors 232, cause the processors to perform the operations described herein for the host 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 234 may store a delivery module 236, a routing module 238, a threshold module 240, a location tracking module 242, a mode master module 244, an authentication module 246, and a decryption key manager 248, which are described in turn. The components may be stored together or in a distributed arrangement. Some of these components may be stored and executed by the device 102 in some embodiments. The computer-readable media 234 may also store drop off/pick up data 250, customer data 252, and security data 254. The security data 254 may be used to unlock or deactivate the secure mode 108(3), among other possible uses.

The delivery module 236 may determine the destinations 114 for pick up and/or drop off of items from the drop off/pick up data 250, the items for each destination, customer information from the customer data 252, and other relevant information for the items.

The routing module 238 may determine the route 116 for the employee to travel with the device 102 based at least in part on the destinations 114 to visit by the employee for tasks or actions related to drop off or pick up of items. The routing module 238 may optimize the route 116 for efficiency, distance, and/or other metrics. In some embodiments, the routing module 238 may determine detours and/or rerouting information that is permissible, authorized, and/or acceptable, such as in response to information such as accidents, road closures, and so forth. In some embodiments, the routing module may also define and determine the boundaries associated with the destinations.

The threshold module 240 may determine an allowable variance from the route 116 which may accommodate for location tracking error, mistakes by the driver, and/or other minor variances from the route 116. The threshold module 240 may include a temporal aspect that limits use of the route 116 to only a portion of the route 116 for a given time, and may thus exclude prior traveled routes and parts of the route that are far off in the distance, for example.

The location tracking module 242 may receive the current location 120 of the device 102. The location tracking module 242 may compare the current location 120 to the threshold and/or the boundaries. The location tracking module 242 may then provide indications as to how to manage data on the device based on the location tracking information, which may be used by at least one of the mode master module 244 and/or the decryption key manager 248.

The mode master module 244 may determine a mode of operation for the device 102 based on the location information. This information, when determined by the host 104, may be transmitted to the device 102 for use by the mode module 208 to cause selection of an operation mode of the device 102.

The authentication module 246 may enable unlocking the device 102 or otherwise exiting the secure mode 108(3) of the device 102 using the security data 254. For example, the authentication module 246 may process credentials to determine whether the credentials are correct for the device 102. In some embodiments, the credentials may be received from a secondary, known device, such as a mobile telephone used by the employee, thus creating further safeguards in the case of the device 102 being stolen. The authentication module 246 may communicate with the secure mode 108(3) and/or the data manager module 210 to enable access to data on the device 102, and thus cause the mode module 208 to enable use of the employee mode 108(1) and/or the customer mode 108(2).

The decryption key manager 248 may transmit a decryption key to the device 102 in response to the current location being within the threshold and/or boundary to enable the device 102 to decrypt data in the local storage. The decryption key manager 248 may transmit the decryption key in response to a request, periodically, randomly, and/or in response to triggering events or requests to ensure that the device 102 has access to the decryption key when the device 102 is permitted to access the local data and when the device is within the threshold and/or boundary. In some embodiments, the decryption key manager 248 may transmit the decryption key to the device 102 to enable the device 102 to decrypt data for a next destination in response to completing a current task/action. Thus, the decryption key manager 248 may enable the data manager module 210 to decrypt and then access portions of data relevant for a next task/action, and thereby minimize exposure to other data, which may remain encrypted.

Illustrative Operation

FIGS. 3-7 show illustrative processes that are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
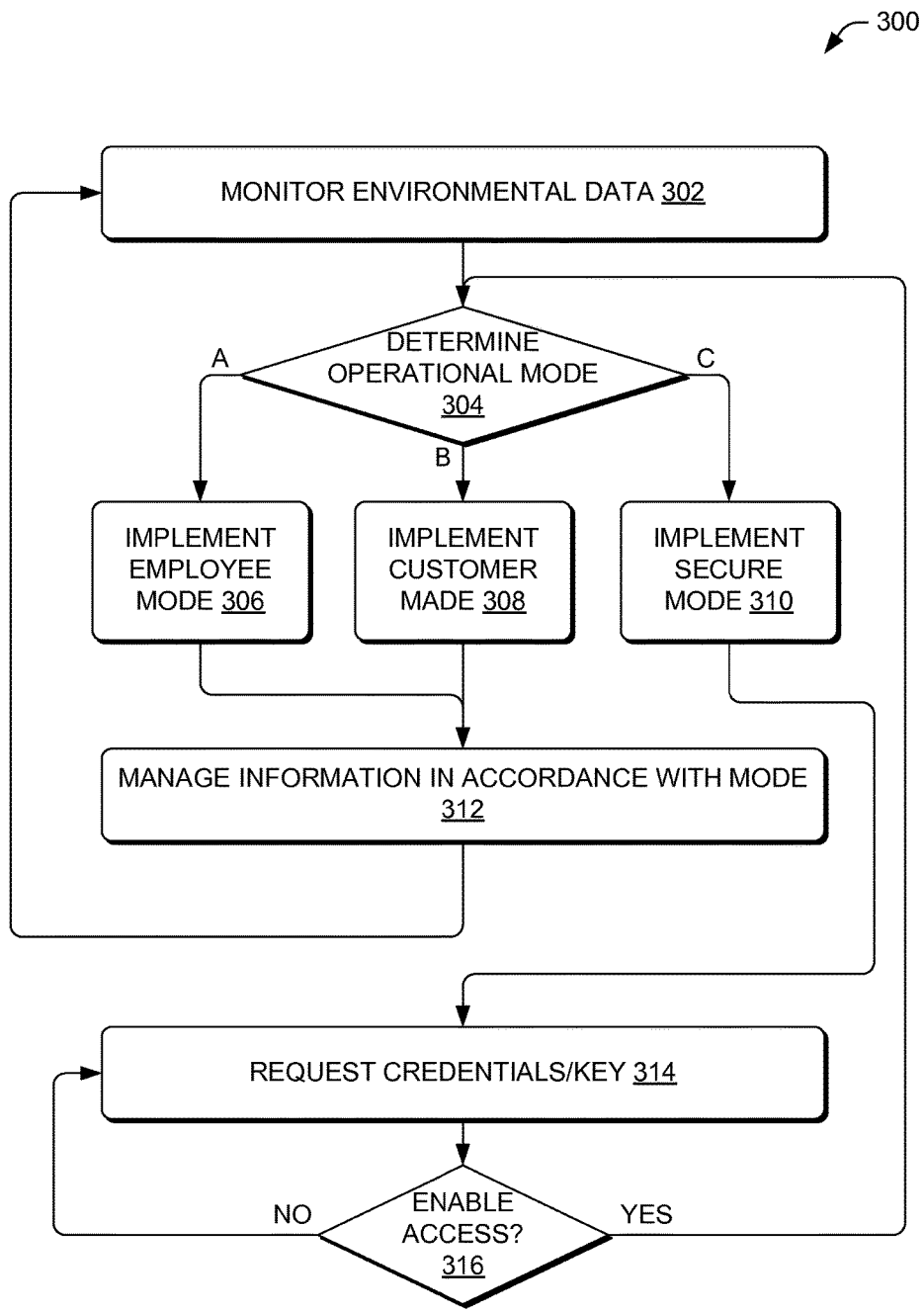
FIG. 3 is a flow diagram of an illustrative process to implement device operational modes using motion information and/or location information associated with a route and/or a boundary of a destination.

FIG. 3 is a flow diagram of an illustrative process 300 to implement device operational modes using motion information and/or location information associated with a route and/or a boundary of a destination. The process 300 is described with reference to the environment 100 and the computing architectures 200 and 230, and may be performed by the device 102, possibly in cooperation with the host 104.

At 302, the device 102 may monitor environmental data, such as by using at least one of the GPS 220, the accelerometer 222, and/or the NFC component 224. The device 102 may use the motion module 206 to monitor the environmental data and/or may offload at least some processing to the host 104, via the location tracking module 242. As described above, the monitoring may include determining whether a current location of the device 102 is within a threshold of a route and/or within a boundary. This determination may be used in the selection of an operating mode as discussed below. In some embodiments, the monitoring may compare acceleration/deceleration of the device to limits, which when exceeded, may cause the device to enter the secure mode 108(3).

At 304, the device 102 may determine an operational mode using the mode module 208 based at least in part on the monitoring of the environmental data at the operation 302. The mode module 208 may receive inputs from the mode master module 244 in some implementations. The operational mode may select one of operations 306, 308 or 310 to execute for the device. The election may be based on the current location of the device with respect to the threshold and boundaries, and/or in response to measured acceleration/deceleration of the device 102. The acceleration/deceleration of the device 102, when exceeding limits, may cause the operational mode to be designated as the secure mode (e.g., following route "C").

At 306, the device 102 may implement the employee mode 108(1) via route "A" from the decision operation 304. The device may implement or continue to implement the employee mode 108(1) in response to the location being within the threshold and outside of any boundary. When executing the employee mode 108(1), the device 102 may at least provide route information for a next destination, provide at least some customer information, and provide at least some information about the items to be picked up or dropped off, thus allowing the employee to successfully perform pick up and/or drop off items.

At 308, the device 102 may implement the customer mode 108(2) via route "B" from the decision operation 304. The device may implement or continue to implement the customer mode 108(2) in response to the location being within the threshold and within one of the boundaries. When executing the customer mode 108(2), the device 102 may restrict at least some functionality of the device when the device is used by the customer. The customer mode 108(2) may provide some information about the items for the customer and/or provide some information about the customer. The customer mode 108(2) may enable entry of information by the customer, such as entry of a signature, payment information, and/or other inputs, including typed inputs, audio inputs, and image capture, for example. The customer mode 108(2) may restrict access to at least some route information, previous/next item/customer information and/or other privileged, private, or sensitive information.

At 310, the device 102 may implement the secure mode 108(3) via route "C" from the decision operation 304. The device may implement or continue to implement the secure mode 108(3) in response to the location being outside of the threshold and/or in response to acceleration/deceleration exceeding limits. The device 102 may exit the secure mode 108(3) in response to receipt of correct credentials, as described below.

Following operations 306 and/or 308, the process 300 may advance to an operation 312. At 312, the device may manage information in accordance with the mode selected from the decision operation 304 following routes A or B. The information for each operational mode is outlined and discussed in detail above. Following the operation 312, the process 300 may continue at the operation 302 discussed above.

Following the operation 310, at 314, the device 102 may request credentials and/or a decryption key to enable the device to exit from the secure mode 108(3) and return to another operational mode. At 316, the device 102, possibly in conjunction with the host 104, may determine whether to enable access, and thus cause the device to determine the operation mode at the decision operation 304. When the credentials are not correct, the process 300 may loop back to the request at the operation 314. In some embodiments, the device may purge, erase, or overwrite data as a failsafe security measure, such as after receipt of a predetermined number of invalid credentials and/or after passage of a predetermined amount of time.

Figure 4:
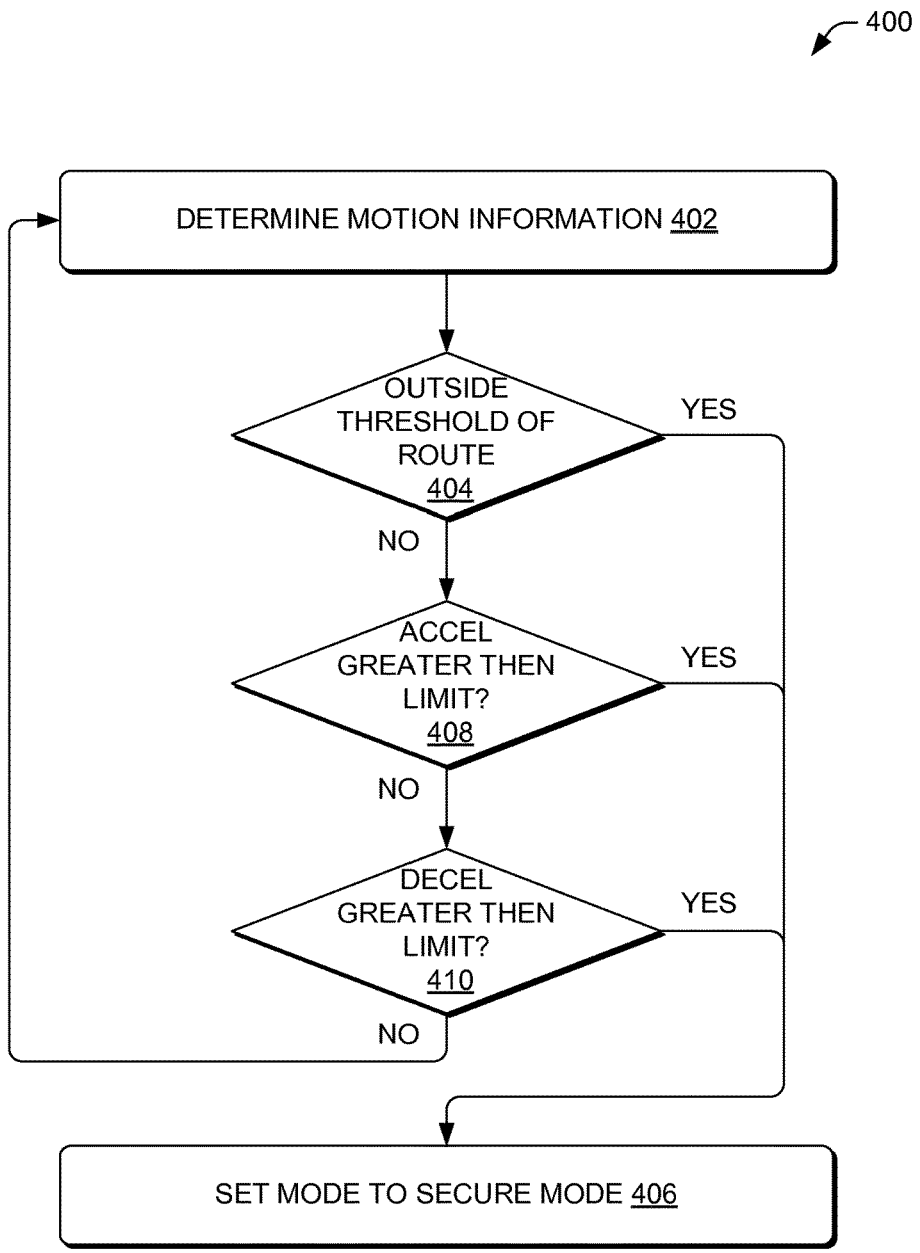
FIG. 4 is a flow diagram of an illustrative process to determine motion information and/or location information that initiates operation of the device in a secure mode.

FIG. 4 is a flow diagram of an illustrative process 400 to determine motion information and/or location information that initiates operation of the device in a secure mode. The process 400 is described with reference to the environment 100 and the computing architectures 200 and 230, and may be performed by the device 102, possibly in cooperation with the host 104. The process 400 describes possible implementations of at least the operations 302, 304, and 310 shown and described in reference to FIG. 3.

At 402, the device 102 may determine motion information, such as via the GPS 220, the accelerometer 222, and/or the NFC component 224. In some embodiments, the device 102 may determine the route information, the threshold, and boundaries for use with the location information from the GPS.

At 404, the device 102 (or possibly the host 104) may determine whether the current location of the device is outside of the threshold from the route. When the device is outside of the threshold (following the "yes" route from the decision operation 404), then the process 400 may advance to an operation 406 and set the mode to the secure mode 108(3). Otherwise, the process 400 may advance to a decision operation 408 (following the "no" route from the decision operation 404).

At 408, the device 102 may determine whether a measured acceleration of the device is greater than a limit. When the acceleration of the device is greater than the limit (following the "yes" route from the decision operation 408), then the process 400 may advance to the operation 406 and set the mode to the secure mode 108(3). Otherwise, the process 400 may advance to a decision operation 410 (following the "no" route from the decision operation 408).

At 410, the device 102 may determine whether a measured deceleration of the device is greater than a limit. When the deceleration of the device is greater than the limit (following the "yes" route from the decision operation 410), then the process 400 may advance to the operation 406 and set the mode to the secure mode 108(3). Otherwise, the process 400 may advance to the operation 402 to continue monitoring (following the "no" route from the decision operation 410). Other motion or use conditions may also be implemented in the framework provided in the process 400 to cause the device 102 to initiate operation in the secure mode 108(3) or another operational mode.

Figure 5:
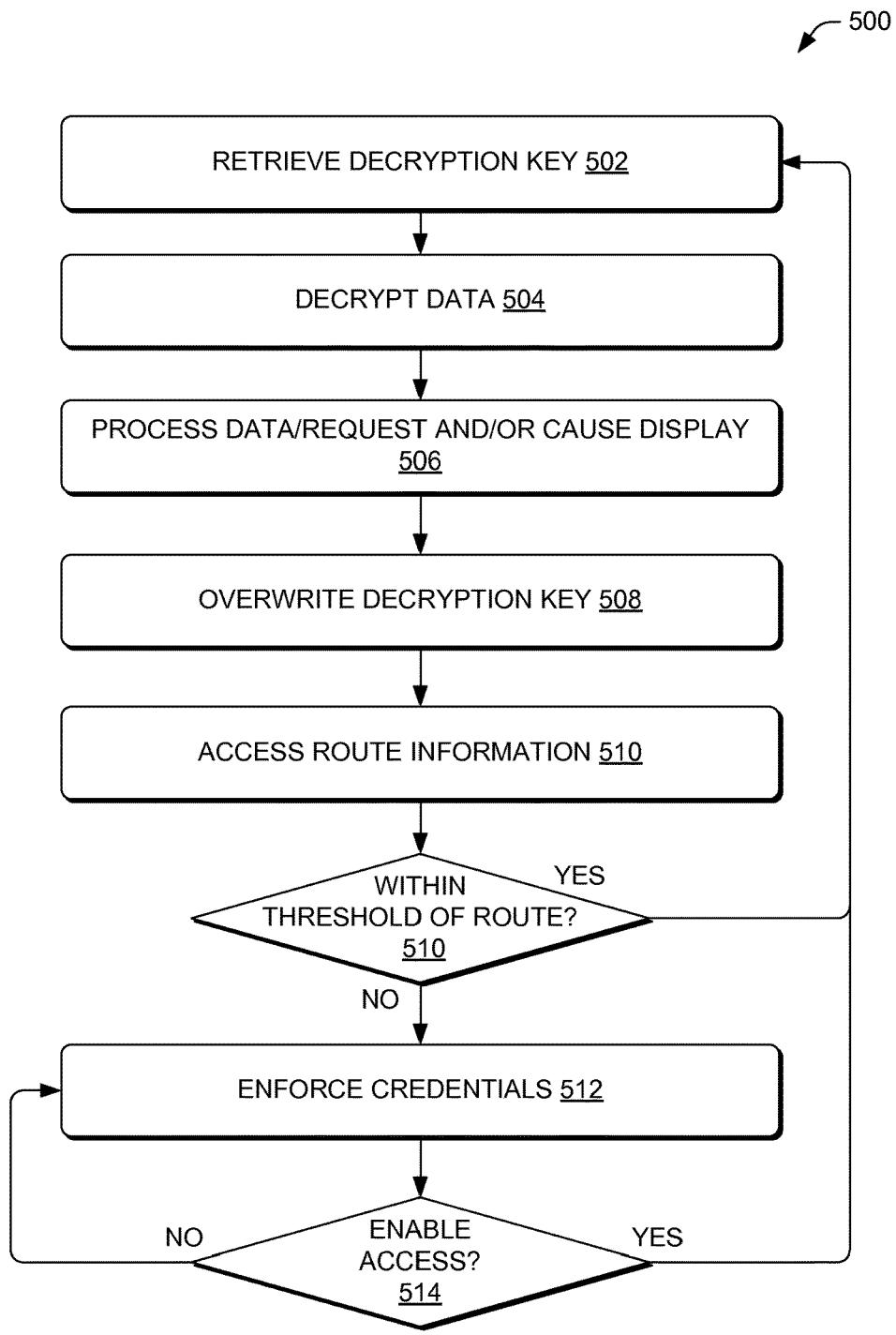
FIG. 5 is a flow diagram of an illustrative process to manage a decryption key on the deployed device.

FIG. 5 is a flow diagram of an illustrative process 500 to manage a decryption key on the deployed device. The process 500 is described with reference to the environment 100 and the computing architectures 200 and 230, and may be performed by the device 102, possibly in cooperation with the host 104. The process 500 describes possible implementations of at least the operation 302 shown and described in reference to FIG. 3.

At 502, the device 102 may receive the decryption key from the host 104. For example the device may transmit location information to the host 104, which may verify the location information and, in response, transmit the decryption key to the device 102.

At 504, the device 102 may decrypt at least some of the local data 212 using the decryption key.

At 506, the device 102 may process data, request data, and/or cause display of data using the decrypted data following the operation 504. In some embodiments, a next task may be determined and planned, such as by loading a next destination, a next route, and so forth for the employee to complete the next task in a series of tasks while preserving other data in encrypted form for later use.

At 508, after the data is loaded, displayed, processed, or otherwise used, the decryption key may be overwritten to prevent unauthorized access to at least some of the local data 212.

At 510, the device 102 may access route information, such as the threshold, the current location of the device, boundary information, and so forth as discussed above to determine an operational mode of the device 102.

At 512, the device 102, possibly in cooperation with the host 104, may determine whether the current location of the device is within the threshold and/or one of the boundaries. When the current location of the device is within the threshold and/or one of the boundaries (following the "yes" route from the decision operation 510), then the process 500 may advance to the operation 502 and possibly receive the decryption key again, such as prior to starting a next task/action. When the current location of the device is outside of the threshold (following the "no" route from the decision operation 510), then the process 500 may advance to an operation 512.

At 512, the device 102 may enforce credentials, and thus operate in the secure mode 108(3). At 514, the device 102, possibly in conjunction with the host 104, may determine whether to enable access, and thus cause the device to again receive the decryption key at the operation 502. When the credentials are not correct, the process 500 may loop back to the request at the operation 512. In some embodiments, the device may purge, erase, or overwrite data as a failsafe security measure, such as after receipt of a predetermined number of invalid credentials.

Figure 6:
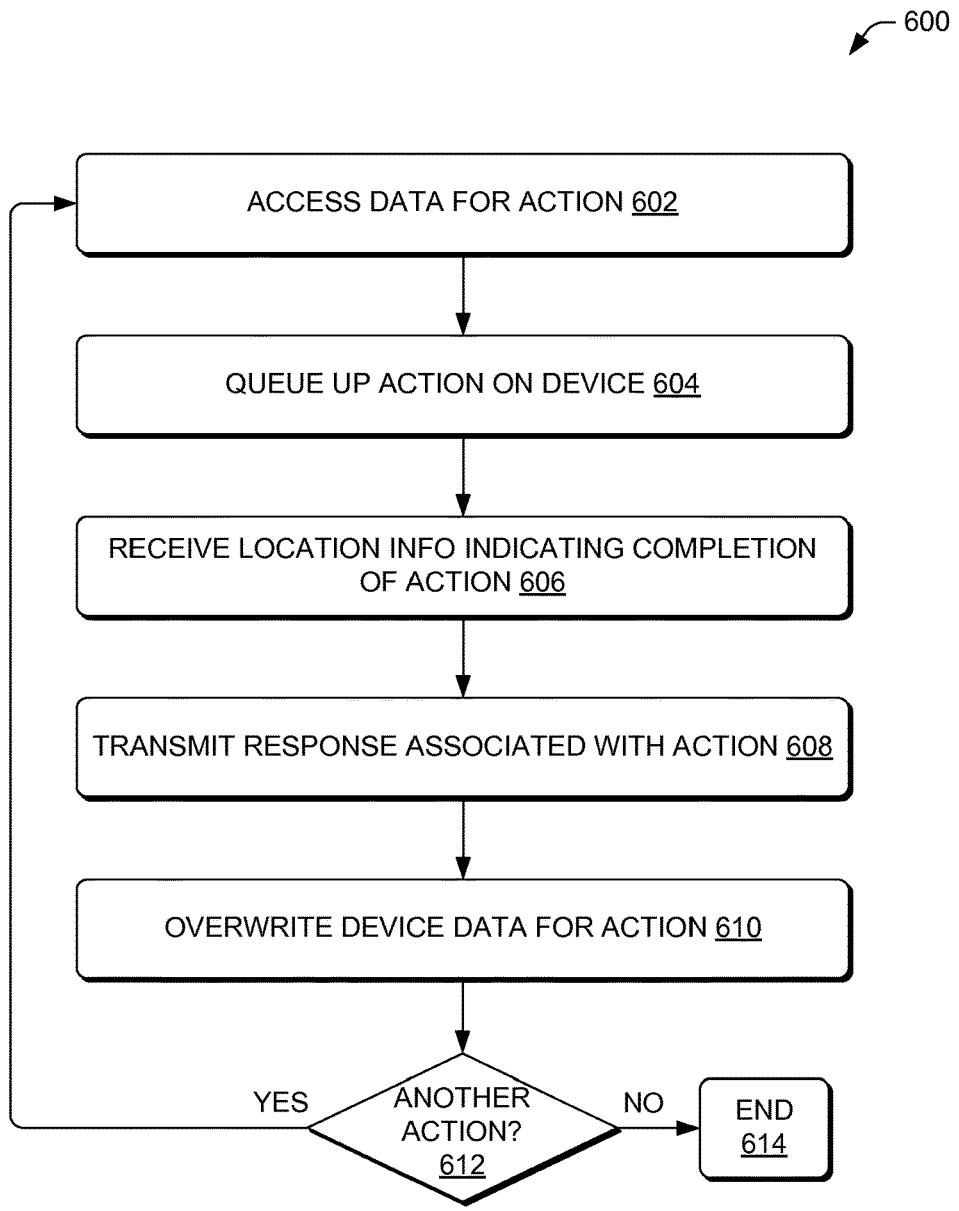
FIG. 6 is a flow diagram of an illustrative process to overwrite or delete data associated with a completed action from the deployed device during deployment of the device and after the completion of the action.

FIG. 6 is a flow diagram of an illustrative process 600 to overwrite or delete data associated with a completed action from the deployed device during deployment of the device and after the completion of the action. The process 600 is described with reference to the environment 100 and the computing architectures 200 and 230, and may be performed by the device 102, possibly in cooperation with the host 104. The process 600 describes possible implementations of at least the operation 312 shown and described in reference to FIG. 3.

At 602, the device 102 may access data for an action/task, such as a next destination. The data may be from the local data 212 that is decrypted using the decryption key. At 604, the device 102 may queue up the action for the employee, such as by populating a user interface with data such as driving direction (static or animated), customer information, item information, and so forth for the next action. Data pertaining to other actions may remain encrypted and/or be purged, as discussed herein.

At 606, the device 102 may receive location information indicating completion or near completion of the action. For example, when the current location enters a boundary of the destination associated with the action, the device 102 may indicate completion or near completion of a delivery. In some instances, the receipt of a confirmation of completion of a task may initiate the completion.

At 608, the device 102 may transmit a response associated with the action, such as a confirmation of completion of the action and/or associated data (e.g., drop/pick up time, customer signature, etc.). In some embodiments, the transmission may be performed after use of the customer mode 108(2). However, in some instances, the customer mode 108(2) may not be invoked, such as when a customer signature or other customer interaction is not needed.

At 610, the device 102 may overwrite the data pertaining to the action to make this data inaccessible.

At 612, the device 102, possibly in conjunction with the host 104, may determine whether another action is ready to be performed. When another action is ready and/or available (following the "yes" route from a decision operation 612), then the process 600 may advance to the operation 602. Otherwise, following the "no" route from the decision operation 612, the process 600 may end at 614.

Figure 7:
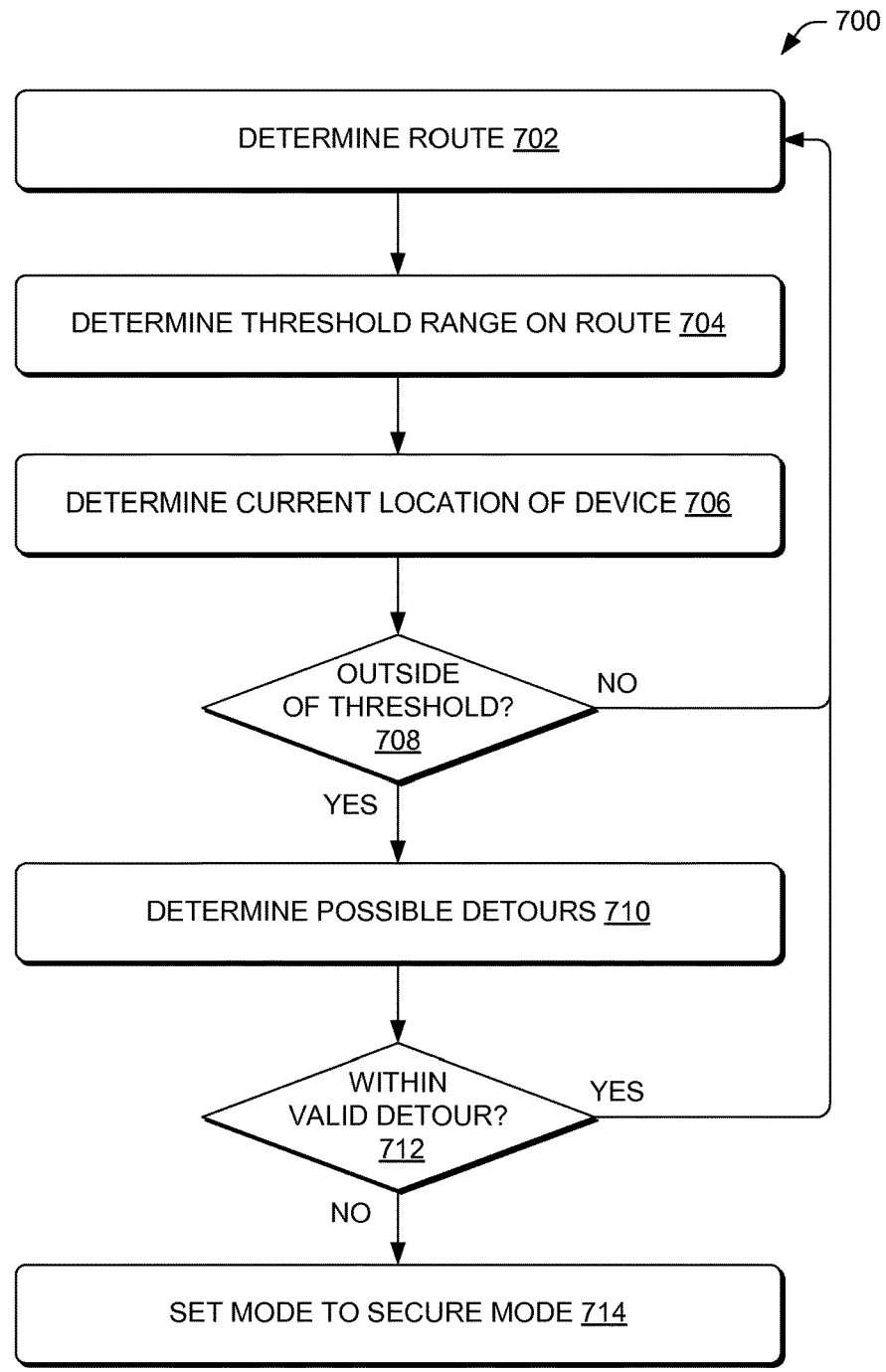
FIG. 7 is a flow diagram of an illustrative process to track a location of the deployed device with respect to a route or a detour.

FIG. 7 is a flow diagram of an illustrative process 700 to track a location of the deployed device with respect to a route or a detour. The process 700 is described with reference to the environment 100 and the computing architectures 200 and 230, and may be performed by the device 102, possibly in cooperation with the host 104. The process 700 describes possible implementations of at least the operation 302 shown and described in reference to FIG. 3.

At 702, the device 102, possibly in conjunction with the host 104, may determine the route at least between two destinations (e.g., between a last stop and a next stop). However, the route may include multiple destinations.

At 704, the device 102, possibly in conjunction with the host 104, may determine the threshold associated with the route, as discussed in detail above.

At 706, the device 102 may determine a current location of the device 102. The current location may be determined by the GPS 220, by triangulation of radio signals, and/or by other known techniques.

At 708, the device 102, possibly in conjunction with the host 104, may determine whether the current location of the device 102 is outside of the threshold. When the current location is not outside of the threshold (following the "no" route from the decision operation 708), then the process 700 may return to the operation 702. When the current location is outside of the threshold (following the "yes" route from the decision operation 708), then the process 700 may advance to an operation 710.

At 710, the device 102, possibly in conjunction with the host 104, may determine possible detours or rerouting information. For example, the routing module 238 may determine that an accident or road closure has occurred and may authorize a detour/rerouting.

At 712, the device 102, possibly in conjunction with the host 104, may determine whether the current location is within the detour/rerouting, possibly using a threshold. When the current location is within a detour (following the "yes" route from the decision operation 712), then the process 700 may return to the operation 702. When the current location is not within a detour (following the "no" route from the decision operation 712), then the process 700 may advance to an operation 714. At 714, the device 102 may enter the secure mode 108(3).

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of managing operation of a device, the method comprising:

determining a destination and boundary associated with one or more items to be picked up or dropped off at the destination;

obtaining route information for a route to at least the destination, the route information including a threshold deviation of the route that is permissible;

storing customer information and information about the one or more items as first privileged data on the device;

storing the route information as second privileged data on the device;

determining a current location of the device relative to the boundary and the route;

causing the device to operate in an employee mode based at least in part on a determination by the device that the current location is outside of the boundary and within the threshold deviation of the route, operation in the employee mode at least causing display of at least some of the second privileged data;

causing the device to operate in a customer mode based at least in part on a determination by the device that the current location is within the boundary, operation in the customer mode at least causing display of at least some of the first privileged data while restricting access of at least the second privileged data; and causing the device to operate in a secure mode based at least in part on a determination by the device that the current location is outside of the boundary and outside of the threshold deviation of the route, operation in the secure mode restricting access, at least temporarily, to the first privileged data and the second privileged data.

2. The method as recited in claim 1, wherein the threshold deviation of the route includes temporal information that designates at least a portion of the route as being within the threshold deviation of the route during a given time or period of time.

3. The method as recited in claim 1, wherein the causing the device to operate in the employee mode includes receiving a decryption key and decrypting at least the second privileged data.

4. The method as recited in claim 1, further comprising:
determining an action associated with the one or more items has been completed;
causing overwriting of data associated with the one or more items to make the data inaccessible, the data including the first privileged data and the second privileged data; and
updating the destination and boundary as being associated with one or more different items.

5. The method as recited in claim 1, further comprising:
determining that the destination is associated with a task;
obtaining the route to at least the destination;
causing the device to operate in a first mode based at least in part on a first determination by the device that the current location is within the threshold deviation of the route, the first mode including at least one of the employee mode or customer mode; and
causing the device to operate in a second mode based at least in part on a second determination by the device that the current location is outside of the threshold deviation of the route, the second mode including secure mode.

6. The method as recited in claim 1, further comprising:
measuring acceleration or deceleration of the device;
determining that the device accelerates faster than a predefined acceleration limit or that the device decelerates faster than a predefined deceleration limit; and
causing the device to operate in the secure mode based at least in part on the determining that the device accelerates faster than the predefined acceleration limit or that the device decelerates faster than the predefined deceleration limit.

7. The method as recited in claim 1, further comprising determining the threshold deviation of the route, wherein the threshold deviation of the route includes temporal information that designates at least a portion of the route as being within the threshold deviation of the route.

8. The method as recited in claim 1, wherein data stored on the device is encrypted, and wherein to operate in the employee mode includes:
receiving a decryption key from a host; and
decrypting the data to form a corresponding decrypted data.

9. The method as recited in claim 8, further comprising:
loading a task with the decrypted data; and
overwriting the decryption key to prevent access to portions of the data pertaining to other tasks.

10. The method as recited in claim 9, further comprising receiving the decryption key from the host in response to transmitting the current location of the device that is within the threshold deviation of the route.

11. The method as recited in claim 1, wherein the device is deployed to manage pick up and drop off of items at various destinations.

12. The method as recited in claim 5, further comprising:
completing the task; and
overwriting data pertaining to the task.

13. The method as recited in claim 1, further comprising:
determining a loss of at least one of location information or connectivity to a network; and
initiating the secure mode.

14. The method as recited in claim 1, wherein the current location is determined by global positioning system (GPS) information from the device.

15. The method as recited in claim 1, wherein the obtaining the route information includes obtaining a detour or rerouting information to the destination in response to a permissible event.

16. The method as recited in claim 1, wherein the device includes:
one or more sensors to measure motion of the device, and further comprising:
determining, based at least in part on the motion of the device, at least one of:
acceleration of the device is greater than a predefined acceleration limit, or
deceleration of the device is greater than a predefined deceleration limit; and
causing the device to enter the secure mode.

17. The method as recited in claim 16, wherein the one or more sensors includes at least one of an accelerometer or a global positioning system (GPS) receiver.

18. The method as recited in claim 1, further comprising causing the device to exit the secure mode in response to receipt of correct credentials.

19. The method as recited in claim 1, wherein the device stores at least item information and address information for the one or more items.

20. The method as recited in claim 16, wherein the device includes a communication interface to exchange data with a host device through a network, the communication interface to receive data pertaining to the route.

* * * * *